(12) United States Patent
Horikoshi et al.

(10) Patent No.: US 12,469,904 B2
(45) Date of Patent: Nov. 11, 2025

(54) FLAT SECONDARY BATTERY

(71) Applicant: MURATA MANUFACTURING CO., LTD., Kyoto (JP)

(72) Inventors: Yoshiichi Horikoshi, Kyoto (JP); Taichi Katsumoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 567 days.

(21) Appl. No.: 17/703,317

(22) Filed: Mar. 24, 2022

(65) Prior Publication Data

US 2022/0216545 A1  Jul. 7, 2022

Related U.S. Application Data

(63) Continuation of application No. PCT/JP2020/033535, filed on Sep. 4, 2020.

(30) Foreign Application Priority Data

Sep. 30, 2019 (JP) ................. 2019-179466

(51) Int. Cl.
*H01M 50/109* (2021.01)
*H01M 50/181* (2021.01)

(52) U.S. Cl.
CPC ....... *H01M 50/109* (2021.01); *H01M 50/181* (2021.01)

(58) Field of Classification Search
None
See application file for complete search history.

(56) References Cited

U.S. PATENT DOCUMENTS

| 5,905,001 | A | 5/1999 | Elliott et al. |
| 6,569,562 | B1 | 5/2003 | Spillman et al. |
| 2001/0016280 | A1 | 8/2001 | Probst et al. |
| 2004/0127952 | A1 | 7/2004 | Phelan et al. |
| 2012/0270091 | A1 | 10/2012 | Kuhn et al. |

(Continued)

FOREIGN PATENT DOCUMENTS

| CN | 205016623 U | 2/2016 |
| EP | 1 050 912 | 11/2000 |

(Continued)

OTHER PUBLICATIONS

Extended European Search Report issued Jan. 25, 2024 in corresponding European Application No. 20872553.1.

(Continued)

*Primary Examiner* — Alix E Eggerding
(74) *Attorney, Agent, or Firm* — K&L Gates LLP

(57) ABSTRACT

A flat secondary battery includes an outer package member, a battery device, and an electrode terminal. The outer package member has a flat and columnar shape, and includes a pair of bottom parts and a sidewall part. The bottom parts are opposed to each other. The sidewall part lies between the bottom parts. At least a portion of a surface of the sidewall part is a curved surface. The battery device is contained inside the outer package member and includes a positive electrode and a negative electrode. The electrode terminal is provided to be exposed at the sidewall part and is coupled to one of the positive electrode and the negative electrode.

10 Claims, 5 Drawing Sheets

(56) References Cited

U.S. PATENT DOCUMENTS

| | | | |
|---|---|---|---|
| 2015/0086842 A1* | 3/2015 | Kang | H01M 50/211 |
| | | | 29/623.5 |
| 2018/0145284 A1* | 5/2018 | Watanabe | H01M 10/0422 |
| 2019/0259981 A1* | 8/2019 | Song | H01M 50/543 |
| 2019/0348718 A1 | 11/2019 | Kawai | |
| 2021/0408627 A1* | 12/2021 | Ma | H01M 50/593 |
| 2022/0223984 A1* | 7/2022 | Lee | H01M 50/559 |
| 2022/0320567 A1* | 10/2022 | Lee | H01M 50/181 |

FOREIGN PATENT DOCUMENTS

| | | |
|---|---|---|
| EP | 1 309 018 | 7/2003 |
| JP | 11144742 A | 5/1999 |
| JP | 2001068075 A | 3/2001 |
| JP | 2001102015 A | 4/2001 |
| JP | 2003077543 A | 3/2003 |
| JP | 2012064366 A | 3/2012 |
| JP | 2012084452 A | 4/2012 |
| JP | 2013026191 A | 2/2013 |
| JP | 2015519691 A | 7/2015 |
| WO | 2013169980 A1 | 11/2013 |
| WO | 2018173751 A1 | 9/2018 |
| WO | 2021051653 | 3/2021 |

OTHER PUBLICATIONS

International Search Report of corresponding PCT application PCT/JP2020/033535, dated Nov. 10, 2020.

Chinese Office Action issued Nov. 1, 2023 in corresponding Chinese Application No. 202080075205.x.

* cited by examiner

FLAT SECONDARY BATTERY

CROSS REFERENCE TO RELATED APPLICATIONS

The present application is a continuation of PCT patent application no. PCT/JP2020/033535 filed on Sep. 4, 2020, which claims priority to Japanese patent application no. JP2019-179466 filed on Sep. 30, 2019, the entire contents of which are being incorporated herein by reference.

BACKGROUND

The present technology relates to a flat secondary battery.

Various electronic apparatuses such as mobile phones have been widely used. Such widespread use has promoted development of a secondary battery as a power source that is smaller in size and lighter in weight and allows for a higher energy density. As such a secondary battery, for example, a small-sized flat secondary battery is known. A configuration of the secondary battery influences a battery characteristic. Accordingly, various considerations have been given to the configuration of the secondary battery.

Specifically, in order to increase utilization of an internal space of a battery case, an electrode assembly is contained inside the battery case made of a laminated film having a side surface including a curved surface and a plane surface, and a positive electrode terminal and a negative electrode terminal are led from the plane surface to the outside of the battery case.

In order to allow for easy installation of a header insulator, an electrode assembly is contained inside a case having a side surface including a curved surface and a plane surface, and a feed-through pin coupled to a positive electrode is led from the plane surface to the outside of the case. In this case, the case is coupled to a negative electrode.

In order to achieve a higher capacity, a group of electrodes is contained inside an outer case and a sealing case that are crimped to each other. The group of electrodes includes a positive electrode and a negative electrode stacked with a separator interposed therebetween.

In order to improve a characteristic such as a load characteristic, a group of electrodes is contained inside a positive electrode case and a negative electrode case fitted to each other. The group of electrodes includes a positive electrode and a negative electrode wound with a separator interposed therebetween.

In order to improve a battery characteristic, an electrode assembly is contained inside two exterior bodies crimped to each other. The electrode assembly includes a positive electrode and a negative electrode stacked with a separator interposed therebetween. The electrode assembly has a circular shape with a notch in a plan view. In this case, in the notch part of the circular shape, a positive electrode tab and a negative electrode tab are coupled to the electrode assembly. The positive electrode tab and the negative electrode tab are contained inside the respective two exterior bodies. The positive electrode tab is coupled to one of the exterior bodies, and the negative electrode tab is coupled to the other of the exterior bodies.

SUMMARY

The present disclosure relates a secondary battery.

Various considerations have been made to solve problems of a secondary battery; however, a flat secondary battery has not yet achieved a sufficient energy density per unit volume, and there is still room for improvement in terms thereof.

The technology of the present disclosure has been made in view of such an issue, and thus, to provide a flat secondary battery that makes it possible to increase an energy density per unit volume according to an embodiment.

A flat secondary battery according to an embodiment of the technology includes an outer package member, a battery device, and an electrode terminal. The outer package member has a flat and columnar shape, and includes a pair of bottom parts and a sidewall part. The bottom parts are opposed to each other. The sidewall part lies between the bottom parts. At least a portion of a surface of the sidewall part is a curved surface. The battery device is contained inside the outer package member and includes a positive electrode and a negative electrode. The electrode terminal is provided to be exposed at the sidewall part and is coupled to one of the positive electrode and the negative electrode.

According to the flat secondary battery of the embodiment of the technology, the battery device is contained inside the outer package member having a flat and columnar shape and in which at least a portion of the surface of the sidewall part is a curved surface. The electrode terminal coupled to one of the positive electrode and the negative electrode is provided at the sidewall part. This makes it possible to increase the energy density per unit volume.

Note that effects of the technology are not necessarily limited to those described above and may include any of a series of suitable effects including described below in relation to the technology.

DETAILED DESCRIPTION

One or more embodiments of the technology of the present disclosure are described below in detail with reference to the drawings.

A description is given first of a flat secondary battery according to an embodiment of the technology.

The flat secondary battery described here is a secondary battery having a flat and columnar shape. Examples of such a secondary battery include a so-called coin-type secondary battery and a so-called button-type secondary battery.

As will be described later, the flat secondary battery includes a pair of bottom parts and a sidewall part. The bottom parts are opposed to each other. The sidewall part lies between the bottom parts. This secondary battery has a height that is small relative to an outer diameter. A description will be given later of specific dimensions (the outer diameter and the height) of the flat secondary battery. Specifically, the flat secondary battery may be flat and cylindrical, or may be flat and generally cylindrical, as will be described later.

Further, the flat secondary battery does not have any crimp part C (see FIG. 7) to be described later. In the illustrated crimp part C, an end of a containing part 111 is bent outward and is thus folded over itself. Further, a portion of the containing part 111 and a portion of a cover part 112 are crimped to each other in a state of being placed over each other. The two members (the containing part 111 and the cover part 112) are thereby placed over each other.

A charge and discharge principle is not particularly limited. The following will describe a case where a battery capacity is obtained by utilizing insertion and extraction of an electrode reactant. The flat secondary battery includes a positive electrode, a negative electrode, and an electrolytic solution. In the flat secondary battery, in order to prevent precipitation of the electrode reactant on a surface of the negative electrode in the middle of charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not limited to a particular kind, the electrode reactant is a light metal, such as an alkali metal or an alkaline earth metal. Examples of the alkali metal include lithium, sodium, and potassium. Examples of the alkaline earth metal include beryllium, magnesium, and calcium.

In the following, a description is given of an example case where the electrode reactant is lithium. A flat secondary battery that obtains the battery capacity by utilizing insertion and extraction of lithium is a so-called lithium-ion secondary battery. In the lithium-ion secondary battery, lithium is inserted and extracted in an ionic state.

Figure 1:
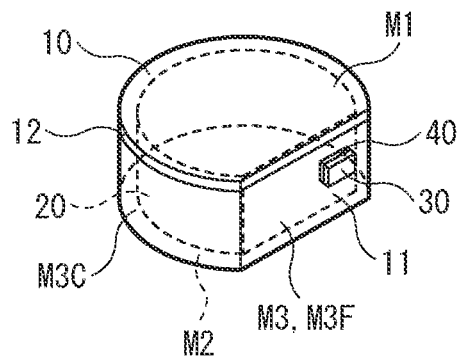
FIG. 1 is a perspective view of a configuration of a flat secondary battery according to an embodiment of the technology of the present disclosure.
Figure 2:
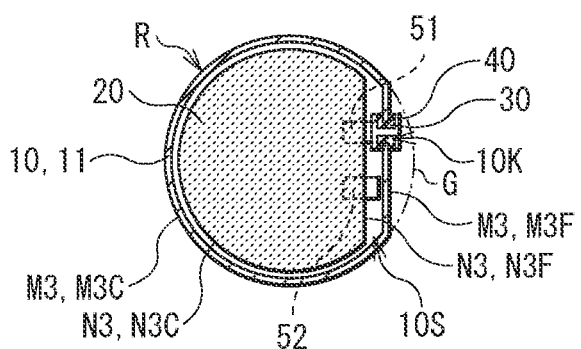
FIG. 2 is a sectional view of the configuration of the flat secondary battery illustrated in FIG. 1.
Figure 3:
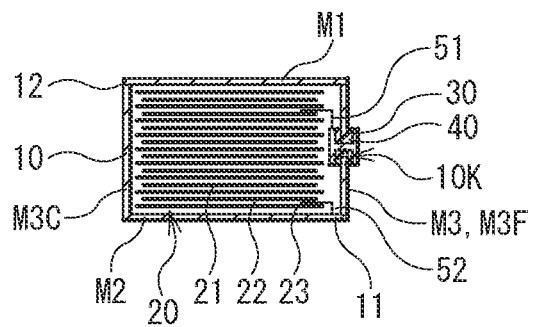
FIG. 3 is another sectional view of the configuration of the flat secondary battery illustrated in FIG. 1.
Figure 4:
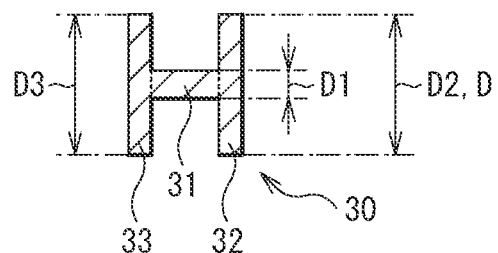
FIG. 4 is an enlarged sectional view of a configuration of an electrode terminal illustrated in FIG. 2.
Figure 5:
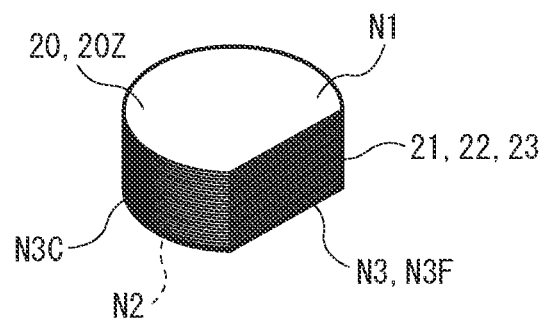
FIG. 5 is a perspective view of a configuration of a battery device illustrated in FIG. 1.

FIG. 1 is a perspective view of a configuration of the flat secondary battery. FIGS. 2 and 3 each illustrate a sectional configuration of the flat secondary battery illustrated in FIG. 1. FIG. 4 is an enlarged sectional view of a configuration of an electrode terminal 30 illustrated in FIG. 2. FIG. 5 is a perspective view of a configuration of a battery device 20 illustrated in FIG. 1. Note that FIG. 2 illustrates a section of the flat secondary battery along a plane intersecting a height direction (a vertical direction in FIG. 1), and FIG. 3 illustrates a section of the flat secondary battery along a plane along the height direction.

For the sake of convenience, the following description is given with an up direction in FIG. 1 as an upper side of the flat secondary battery, and a down direction in FIG. 1 as a lower side of the flat secondary battery.

As illustrated in FIGS. 1 to 3, the flat secondary battery has a flat and columnar three-dimensional shape with a height (a maximum height) thereof small relative to an outer diameter (a maximum outer diameter) thereof. Dimensions of the flat secondary battery are not particularly limited; however, for example, the outer diameter is from 3 mm to 30 mm both inclusive, and the height is from 0.5 mm to 70 mm both inclusive. Note that a ratio of the outer diameter to the height, i.e., outer diameter/height, is greater than 1 and smaller than or equal to 25. The outer diameter is a dimension in a horizontal direction in FIGS. 1 and 3, and the height is, as described above, a dimension in the vertical direction in FIGS. 1 and 3.

Specifically, as illustrated in FIGS. 1 to 5, the flat secondary battery includes a battery can 10, the battery device 20, the electrode terminal 30, a gasket 40, a positive electrode lead 51, and a negative electrode lead 52.

As illustrated in FIGS. 1 to 3, the battery can 10 is an outer package member that contains the battery device 20 inside.

The battery can 10 has a hollow, flat and cylindrical three-dimensional shape in accordance with the three-dimensional shape of the flat secondary battery described above. The battery can 10 thus includes a pair of bottom parts M1 and M2, and a sidewall part M3. The bottom parts M1 and M2 are opposed to each other. The sidewall part M3 lies between the bottom parts M1 and M2. The sidewall part M3 is coupled to the bottom part M1 at one end, and is coupled to the bottom part M2 at the other end.

Here, the battery can 10 has a generally cylindrical three-dimensional shape. Specifically, a portion of a surface of the sidewall part M3 is a curved surface M3C that is convex toward the outside of the battery can 10, and the other portion of the surface of the sidewall part M3 is a plane surface M3F. In other words, the surface of the sidewall part M3 includes the curved surface M3C and the plane surface M3F. Thus, one end of the plane surface M3F is coupled to one end of the curved surface M3C, and the other end of the plane surface M3F is coupled to the other end of the curved surface M3C to thereby provide the sidewall part M3. As will be described later, the electrode terminal 30 is provided at the sidewall part M3 (the plane surface M3F).

A circumscribed circle G illustrated in FIG. 2 represents a circular outline along the sidewall part M3 (the curved surface M3C) of the battery can 10, that is, an outline of a circular shape defined by the curved surface M3C. The curved surface M3C is thus curved along a portion (an arc R) of the circumscribed circle G.

A range of the surface of the sidewall part M3 occupied by the curved surface M3C is determined on the basis of a range of the circumscribed circle G occupied by the arc R. Although not particularly limited, a ratio of the arc R to the circumscribed circle G, that is, a ratio of a length of the arc R to a length (a circumference) of the circumscribed circle G is preferably as high as possible within a range allowing for mounting of the electrode terminal 30 to the battery can 10, in particular. A reason for this is that increasing the ratio of the arc R increases a device space volume, and consequently increases also the energy density per unit volume. The "device space volume" refers to a volume (an effective volume) of an internal space of the battery can 10 available for containing the battery device 20 therein.

The battery can 10 includes a containing part 11 and a cover part 12. The containing part 11 is a flat and generally cylindrical (handleless mug-shaped) member with one end open and the other end closed. The containing part 11 contains the battery device 20. More specifically, to allow the battery device 20 to be contained therein, the containing part 11 has an opening 11K (see FIG. 6) to be described later. The cover part 12 is a generally plate-shaped member, and is joined to the containing part 11 to cover the opening 11K.

Here, as will be described later, the cover part 12 is joined to the containing part 11 by a method such as a welding method. More specifically, the battery can 10 is a welded can including two members (the containing part 11 and the cover part 12) welded to each other. The battery can 10 after the cover part 12 has been joined to the containing part 11 is a single member as a whole, that is, not separable into two or more members. Note that the battery can 10 may be a can (a single member as a whole) including three or more members welded to each other.

As a result, the battery can 10 is a single member including no folded-over portion or no portion in which two or more members are placed over each other. What is meant by "including no folded-over portion in the middle" is that the battery can 10 is not so processed as to include a portion folded over another portion. What is meant by "including no portion in which two or more members are placed over each other" is that the battery can 10 is physically a single member and is therefore not a composite body in which two or more members including a container and a cover are so fitted to each other as to be separable later. More specifically, as described above, the "folded-over portion" and the "portion in which two or more members are placed over each other" each correspond to the crimp part C provided in a flat secondary battery of a comparative example (see FIG. 7) to be described later.

Thus, the battery can 10 described here is without the foregoing crimp part C, and is therefore a so-called crimpless can. A reason for employing the crimpless can is that this increases the device space volume inside the battery can 10, and accordingly, increases also the energy density per unit volume.

The battery can 10 is electrically conductive. The battery can 10 thus serves as a negative electrode terminal because the battery can 10 is coupled to a negative electrode 22, which will be described later, of the battery device 20. A reason for employing such a configuration is that allowing the battery can 10 to serve as the negative electrode terminal makes it unnecessary to provide a negative electrode terminal separate from the battery can 10 in the flat secondary battery. A decrease in device space volume resulting from the presence of a negative electrode terminal is thereby avoided. This results in an increase in device space volume, and accordingly an increase in energy density per unit volume.

Further, the battery can 10 has a through hole 10K at the sidewall part M3 (the plane surface M3F). The through hole 10K is used to attach the electrode terminal 30 to the battery can 10.

The battery can 10 includes one or more of electrically conductive materials including, without limitation, metals (including stainless steel) and alloys. Here, in order to serve as the negative electrode terminal, the battery can 10 includes one or more of materials including, without limitation, iron, copper, nickel, stainless steel, an iron alloy, a copper alloy, and a nickel alloy. The kinds of the stainless steel employable include SUS304 and SUS316, but are not particularly limited thereto.

Note that, as will be described later, the battery can 10 is insulated via the gasket 40 from the electrode terminal 30 serving as a positive electrode terminal. A reason for this is that a contact (a short circuit) between the battery can 10 and the electrode terminal 30 is thereby prevented.

The battery device 20 is a device causing charging and discharging reactions to proceed, and includes, as illustrated in FIGS. 1 to 3 and FIG. 5, a positive electrode 21, the negative electrode 22, a separator 23, and an electrolytic solution which is a liquid electrolyte. Note that the battery device 20 is shaded in FIG. 2, and the illustration of the electrolytic solution is omitted from each of FIGS. 3 and 5.

The battery device 20 has a three-dimensional shape corresponding to the three-dimensional shape of the battery can 10. The "three-dimensional shape corresponding to the three-dimensional shape of the battery can 10" refers to a three-dimensional shape similar to that of the battery can 10. A reason for allowing the battery device 20 to have such a three-dimensional shape is that this makes it harder for a so-called dead space (a gap between the battery can 10 and the battery device 20) to result upon placing the battery device 20 in the battery can 10 than in a case where the battery device 20 has a three-dimensional shape different from that of the battery can 10. This allows for efficient use of the internal space of the battery can 10, resulting in an increase in device space volume, and accordingly an increase in energy density per unit volume. Here, the battery can 10 has a generally cylindrical three-dimensional shape as described above, and therefore the battery device 20 also has a generally cylindrical three-dimensional shape.

Specifically, as described above, the battery can 10 has a generally cylindrical three-dimensional shape with the pair of bottom parts M1 and M2 and the sidewall part M3 (the curved surface M3C and the plane surface M3F), and the battery device 20 thus has a generally cylindrical three-dimensional shape, as with the battery can 10. In this case, the battery device 20 includes a pair of bottom parts N1 and N2 corresponding to the pair of bottom parts M1 and M2, and a sidewall part N3 (a curved surface N3C and a plane surface N3F) corresponding to the sidewall part M3 (the curved surface M3C and the plane surface M3F). Accordingly, the positive electrode 21, the negative electrode 22, and the separator 23 each have a plan shape defined by the curved surface N3C and the plane surface N3F, in other words, a generally circular plan shape with a taper surface at one location.

Here, the positive electrode 21 and the negative electrode 22 are stacked with the separator 23 interposed therebetween. More specifically, a plurality of positive electrodes 21 and a plurality of negative electrodes 22 are alternately stacked in the height direction with the separators 23 interposed therebetween. Thus, the battery device 20 is a stacked electrode body including the positive electrode 21 and the negative electrode 22 that are stacked with the separator 23 interposed therebetween. The number of each of the positive electrodes 21, the negative electrodes 22, and the separators 23 to be stacked is not particularly limited, and may be freely chosen.

The plan shape of each of the positive electrode 21 and the negative electrode 22 is preferably smaller in area than the plan shape of the separator 23. In this case, an outer edge of each of the positive electrode 21 and the negative electrode 22 is preferably recessed back from an outer edge of the separator 23 toward an inner side. A reason for this is that this prevents a short circuit between the battery can 10 serving as the negative electrode terminal and the positive electrode 21. Further, the plan shape of the negative electrode 22 is preferably larger in area than the plan shape of the positive electrode 21. A reason for this is that this prevents a short circuit between the positive electrode 21 and the negative electrode 22 caused by precipitation of lithium upon charging and discharging.

The positive electrode 21 includes a positive electrode current collector and a positive electrode active material layer. The positive electrode active material layer may be provided on each of both sides of the positive electrode current collector, or may be provided only on one side of the positive electrode current collector. The positive electrode current collector includes a material similar to a material included in the electrode terminal 30. Note that the material included in the positive electrode current collector may be the same as or different from the material included in the electrode terminal 30. The positive electrode active material layer includes a positive electrode active material into which lithium is insertable and from which lithium is extractable. The positive electrode active material includes one or more of lithium-containing compounds including, without limitation, a lithium-containing transition metal compound. Examples of the lithium-containing transition metal compound include an oxide, a phosphoric acid compound, a silicic acid compound, and a boric acid compound each including lithium and one or more transition metal elements as constituent elements. Note that the positive electrode active material layer may further include, without limitation, a positive electrode binder and a positive electrode conductor.

The negative electrode 22 includes a negative electrode current collector and a negative electrode active material layer. The negative electrode active material layer may be provided on each of both sides of the negative electrode current collector, or may be provided only on one side of the negative electrode current collector. The negative electrode current collector includes a material similar to the material included in the battery can 10. Note that the material included in the negative electrode current collector may be the same as or different from the material included in the battery can 10. The negative electrode active material layer includes a negative electrode active material into which lithium is insertable and from which lithium is extractable. The negative electrode active material includes one or more of materials including, without limitation, a carbon material and a metal-based material. Examples of the carbon material include graphite. The metal-based material is a material that includes, as a constituent element or constituent elements, one or more elements among metal elements and metalloid elements that are each able to form an alloy with lithium. Specifically, the metal-based material includes one or more of elements including, without limitation, silicon and tin, as a constituent element or constituent elements. The metal-based material may be a simple substance, an alloy, a compound, or a mixture of two or more thereof. Note that the negative electrode active material layer may further include, without limitation, a negative electrode binder and a negative electrode conductor.

The separator 23 is an insulating porous film interposed between the positive electrode 21 and the negative electrode 22. The separator 23 allows lithium to pass therethrough while preventing a short circuit between the positive electrode 21 and the negative electrode 22. This separator 23 includes one or more of polymer compounds, including polyethylene.

The positive electrode 21, the negative electrode 22, and the separator 23 are each impregnated with the electrolytic solution. The electrolytic solution includes a solvent and an electrolyte salt. The solvent includes one or more of non-aqueous solvents (organic solvents) including, without limitation, a carbonic-acid-ester-based compound, a carboxylic-acid-ester-based compound, and a lactone-based compound. The electrolyte salt includes one or more of light metal salts, including a lithium salt.

Note that FIG. 5 also illustrates a stacked body 20Z to be used to fabricate the battery device 20 in a process of manufacturing the flat secondary battery to be described later. The stacked body 20Z has a configuration similar to that of the battery device 20, which is a wound electrode body, except that the positive electrode 21, the negative electrode 22, and the separator 23 are each yet to be impregnated with the electrolytic solution.

The electrode terminal 30 is an external coupling terminal to be coupled to an electronic apparatus on which the flat secondary battery is mountable. Here, as illustrated in FIGS. 1 to 4, the electrode terminal 30 is coupled to the positive electrode 21 (the positive electrode current collector) of the battery device 20. The electrode terminal 30 thus serves as the positive electrode terminal. As a result, upon use of the flat secondary battery, the flat secondary battery is coupled to the electronic apparatus via the electrode terminal 30 (the positive electrode terminal) and the battery can 10 (the negative electrode terminal), and the electronic apparatus thereby becomes operable using the flat secondary battery as a power source.

The electrode terminal 30 is provided at the sidewall part M3 (the plane surface M3F) of the battery can 10, as described above. In this case, the electrode terminal 30 is placed through the through hole 10K provided at the sidewall part M3. The electrode terminal 30 is thus attached to the battery can 10 via the through hole 10K. Note that a portion of the electrode terminal 30 is exposed from the sidewall part M3 in order to serve as an external coupling terminal. In this case, the electrode terminal 30 preferably protrudes from the plane surface M3F. A reason for this is that this makes it easier for the flat secondary battery to be coupled to an electronic apparatus via the electrode terminal 30.

In a case where the electrode terminal 30 protrudes from the battery can 10 (the plane surface M3F), the protrusion range of the electrode terminal 30 is not particularly limited.

In particular, the electrode terminal 30 preferably lies inside the circumscribed circle G defined by the curved surface M3C described above. In other words, the electrode terminal 30 is preferably recessed relative to the circumference of the circumscribed circle G toward the inner side without any portion lying outside the circumscribed circle G. A reason for this is that this increases the energy density per unit volume.

Specifically, if the electrode terminal 30 extends to the outside of the circumscribed circle G, the flat secondary battery increases in outer diameter due to the presence of the electrode terminal 30, and this results in a lower energy density per unit volume. In contrast, in a case where the electrode terminal 30 is recessed relative to the circumference of the circumscribed circle G toward the inner side, the presence of the electrode terminal 30 causes no increase in outer diameter of the flat secondary battery, and this results in a higher energy density per unit volume.

Note that the electrode terminal 30 includes one or more of electrically conductive materials including, without limitation, metals (including stainless steel) and alloys. Here, in order to serve as the positive electrode terminal, the electrode terminal 30 includes one or more of materials including, without limitation, aluminum, an aluminum alloy, and stainless steel.

The three-dimensional shape of the electrode terminal 30 is not particularly limited. Here, the electrode terminal 30 includes terminal parts 31, 32, and 33. The terminal parts 32 and 33 are coupled to respective opposite ends of the terminal part 31.

Specifically, the terminal part 31 is a first terminal part having a cylindrical shape and disposed in the through hole 10K. The terminal part 31 has an outer diameter D (D1)

smaller than an inner diameter of the through hole 10K. The terminal part 32 is a second terminal part having a cylindrical shape, and is disposed on a rear side in a direction from the electrode terminal 30 toward the inside of the battery can 10, that is, toward the left in FIG. 3. The terminal part 32 is coupled to one end of the terminal part 31. The terminal part 32 has an outer diameter D (D2) larger than the inner diameter of the through hole 10K. The terminal part 33 is a third terminal part having a cylindrical shape, and is disposed on a front side in the direction from the electrode terminal 30 toward the inside of the battery can 10. The terminal part 33 is coupled to the other end of the terminal part 31. The terminal part 33 has an outer diameter D (D3) larger than the inner diameter of the through hole 10K. Here, the terminal part 32 is disposed outside the battery can 10, and the terminal part 33 is disposed inside the battery can 10. Note that the outer diameters D2 and D3 may be equal, or may be different from each other.

Thus, the electrode terminal 30 has such a three-dimensional shape that the outer diameter D is reduced locally in the middle. A reason for employing such a shape is that the outer diameter D2 of the terminal part 32 larger than the inner diameter of the through hole 10K helps to prevent the terminal part 32 from passing through the through hole 10K, and the outer diameter D3 of the terminal part 33 larger than the inner diameter of the through hole 10K helps to prevent the terminal part 33 from passing through the through hole 10K. A further reason is that the electrode terminal 30 is fixed to the battery can 10 by utilizing a pressing force of the terminal part 32 on the battery can 10 and a pressing force of the terminal part 33 on the battery can 10. This helps to prevent the electrode terminal 30 from falling out of the battery can 10.

The gasket 40 is an insulating member disposed between the battery can 10 and the electrode terminal 30, as illustrated in FIGS. 1 to 3. The gasket 40 insulates the electrode terminal 30 from the battery can 10. The electrode terminal 30 is thus fixed to the battery can 10 with the gasket 40 interposed therebetween.

The gasket 40 includes one or more of insulating materials including, without limitation, polypropylene and polyethylene.

A mounting range of the gasket 40 is not particularly limited. Here, the gasket 40 is disposed in a gap between the battery can 10 and the electrode terminal 30.

As illustrated in FIGS. 2 and 3, the positive electrode lead 51 is a wiring member that couples the electrode terminal 30 and the positive electrode 21 (the positive electrode current collector) to each other, and includes a material similar to the material included in the electrode terminal 30. Note that the material included in the positive electrode lead 51 may be the same as or different from the material included in the electrode terminal 30. A coupling position of the positive electrode lead 51 to the positive electrode 21 is not particularly limited, and may be freely chosen. The number of the positive electrode leads 51 is not particularly limited, and may be freely chosen. Here, the number of the positive electrode leads 51 is one.

As illustrated in FIGS. 2 and 3, the negative electrode lead 52 is a wiring member that couples the battery can 10 and the negative electrode 22 (the negative electrode current collector) to each other, and includes a material similar to the material included in the battery can 10. Note that the material included in the negative electrode lead 52 may be the same as or different from the material included in the battery can 10. A coupling position of the negative electrode lead 52 to the negative electrode 22 is not particularly limited, and may be freely chosen. The number of the negative electrode leads 52 is not particularly limited, and may be freely chosen. Here, the number of the negative electrode leads 52 is one.

Note that the flat secondary battery may further include one or more of other unillustrated components.

Specifically, the flat secondary battery includes a safety valve mechanism. The safety valve mechanism cuts off the electrical coupling between the battery can 10 and the battery device 20 if an internal pressure of the battery can 10 reaches a certain level or higher due to, e.g., an internal short circuit or heating from outside. Although a mounting position of the safety valve mechanism is not particularly limited, the safety valve mechanism is provided at one of the bottom parts M1 and M2, preferably the bottom part M2 at which the electrode terminal 30 is not provided.

Further, the flat secondary battery includes an insulator between the battery can 10 and the battery device 20. The insulator includes one or more of materials including, without limitation, an insulating film and an insulating sheet, and prevents a short circuit between the battery can 10 and the battery device 20 (the positive electrode 21). A mounting range of the insulator is not particularly limited, and may be freely chosen.

Note that the battery can 10 is provided with, for example, a liquid injection hole and a cleavage valve. The liquid injection hole is used for injecting the electrolytic solution into the battery can 10, and is sealed after use. In a case where the internal pressure of the battery can 10 reaches a certain level or higher due to, e.g., an internal short circuit or heating from outside as described above, the cleavage valve cleaves to release the internal pressure. Although there is no limitation on the respective positions at which the liquid injection hole and the cleavage valve are to be provided, the liquid injection hole and the cleavage valve are each provided at one of the bottom parts M1 and M2, preferably the bottom part M2 at which the electrode terminal 30 is not provided, as with the mounting position of the safety valve mechanism described above.

The flat secondary battery operates in a manner described below. Upon charging, in the battery device 20, lithium is extracted from the positive electrode 21, and the extracted lithium is inserted into the negative electrode 22 via the electrolytic solution. Upon discharging, in the battery device 20, lithium is extracted from the negative electrode 22, and the extracted lithium is inserted into the positive electrode 21 via the electrolytic solution. In these cases, the lithium is inserted and extracted in an ionic state.

Figure 6:
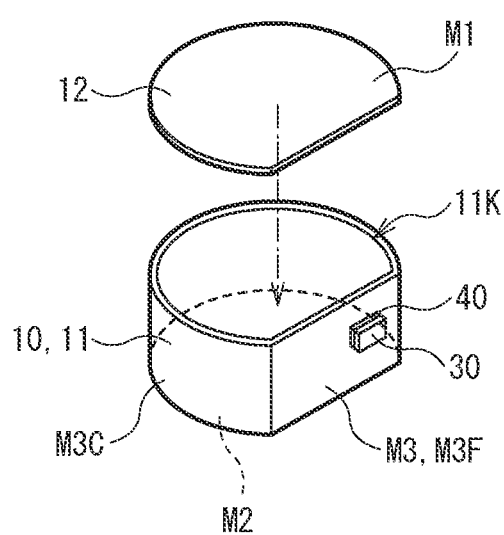
FIG. 6 is a perspective view of a configuration of a battery can to be used in a process of manufacturing the flat secondary battery.

FIG. 6 is a perspective view of the configuration of the battery can 10 to be used in a process of manufacturing the flat secondary battery, and corresponds to FIG. 1. Note that FIG. 6 illustrates a state where the cover part 12 is separated from the containing part 11. In the following, FIGS. 1 to 5 described already will be referred to when necessary.

In a case of manufacturing the flat secondary battery, the flat secondary battery is assembled by a procedure described below. In this case, the stacked body 20Z described above is used to fabricate the battery device 20, and the cover part 12 with the electrode terminal 30 attached thereto with the gasket 40 therebetween in advance is used to assemble the battery can 10.

First, prepared is a slurry including, without limitation, the positive electrode active material in a solvent such as an organic solvent, following which the slurry is applied on the positive electrode current collector to thereby form the positive electrode active material layer. The positive electrode 21 including the positive electrode current collector and the positive electrode active material layer is thereby fabricated.

Thereafter, prepared is a slurry including, without limitation, the negative electrode active material in a solvent such as an organic solvent, following which the slurry is applied on the negative electrode current collector to thereby form the negative electrode active material layer. The negative electrode 22 including the negative electrode current collector and the negative electrode active material layer is thereby fabricated.

Thereafter, the electrolyte salt is added to a solvent. The electrolytic solution including the solvent and the electrolyte salt is thereby prepared.

Thereafter, the positive electrode 21 and the negative electrode 22 are alternately stacked with the separator 23 interposed therebetween to thereby fabricate the stacked body 20Z.

Thereafter, the stacked body 20Z is placed into the containing part 11 through the opening 11K. In this case, one end of the negative electrode lead 52 is coupled to the stacked body 20Z (the negative electrode current collector of the negative electrode 22) and the other end of the negative electrode lead 52 is coupled to the battery can 10 by a method such as a welding method. Note that one or more of welding methods including, without limitation, a laser welding method and a resistance welding method may be used. Details of the welding method described here apply also to the following.

Thereafter, the cover part 12 with the electrode terminal 30 attached thereto with the gasket 40 therebetween in advance is placed on the containing part 11 to cover the opening 11K, following which the cover part 12 is joined to the containing part 11 by a method such as a welding method. In this case, one end of the positive electrode lead 51 is coupled to the stacked body 20Z (the positive electrode current collector of the positive electrode 21) and the other end of the positive electrode lead 51 is coupled to the electrode terminal 30 by a method such as a welding method. The stacked body 20Z is thereby enclosed inside the battery can 10 (the containing part 11 and the cover part 12).

Lastly, the electrolytic solution is injected into the battery can 10 through the unillustrated liquid injection hole, following which the liquid injection hole is sealed. This causes the stacked body 20Z (the positive electrode 21, the negative electrode 22, and the separator 23) to be impregnated with the electrolytic solution, thereby fabricating the battery device 20. The battery device 20 is thus sealed inside the battery can 10. As a result, the flat secondary battery is completed.

According to the flat secondary battery, the battery device 20 is contained inside the battery can 10 having a columnar shape and including the sidewall part M3 (the curved surface M3C and the plane surface M3F), and the electrode terminal 30 coupled to the positive electrode 21 of the battery device 20 is provided at the sidewall part M3 (the plane surface M3F). As a result, for a reason described below, it is possible to increase the energy density per unit volume.

Figure 7:
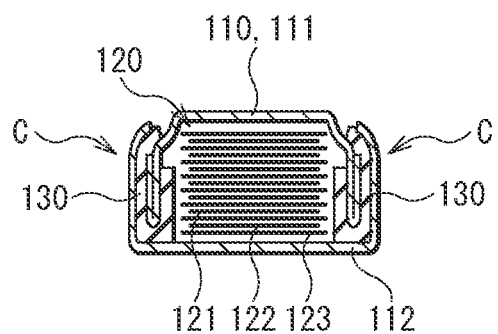
FIG. 7 is a sectional view of a configuration of a flat secondary battery of a comparative example.
Figure 8:
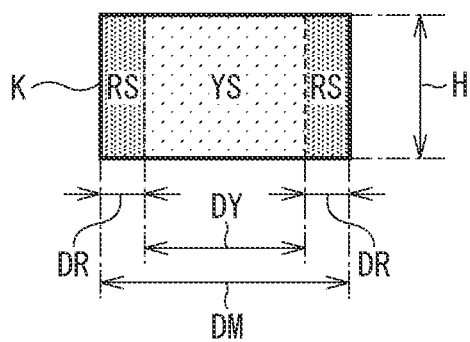
FIG. 8 is a schematic diagram for describing a device space volume of the flat secondary battery of the comparative example.
Figure 9:
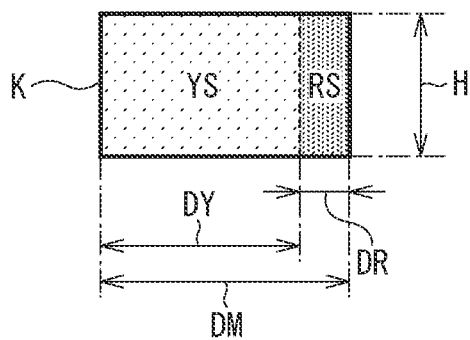
FIG. 9 is a schematic diagram for describing a device space volume of the flat secondary battery according to the embodiment of the technology.

FIG. 7 illustrates a sectional configuration of a flat secondary battery of a comparative example, and corresponds to FIG. 3. FIGS. 8 and 9 each schematically illustrate a configuration of a flat secondary battery for describing the device space volume. Note that FIG. 8 illustrates the flat secondary battery of the comparative example, and FIG. 9 illustrates the flat secondary battery according to the present embodiment.

As illustrated in FIG. 7, the flat secondary battery of the comparative example includes a battery can 110 (the containing part 111 and the cover part 112) and a battery device 120 (a positive electrode 121, a negative electrode 122, and a separator 123) that respectively correspond to the battery can 10 (the containing part 11 and the cover part 12) and the battery device 20 (the positive electrode 21, the negative electrode 22, and the separator 23). The flat secondary battery of the comparative example further includes a gasket 130.

Each of the containing part 111 and the cover part 112 is a flat and cylindrical (handleless mug-shaped) member with one end open and the other end closed. The containing part 111 contains the battery device 120. The containing part 111 and the cover part 112 are disposed to be opposed to each other. The containing part 111 and the cover part 112 are fitted to each other with the battery device 120 contained inside the containing part 111, and are also crimped to each other with the gasket 130 interposed therebetween. In this case, an end of the containing part 111 on a side opposed to the cover part 112 is bent outward, and a portion of the containing part 111 and a portion of the cover part 112 are crimped to each other with the gasket 130 interposed therebetween. The so-called crimp part C (crimped part) is thus provided. The battery device 120 (the positive electrode 121, the negative electrode 122, and the separator 123) has a configuration similar to that of the battery device 20 (the positive electrode 21, the negative electrode 22, and the separator 23).

The positive electrode 121 of the battery device 120 is coupled to the containing part 111 via an unillustrated positive electrode lead. The containing part 111 thus serves as the positive electrode terminal. Besides, the negative electrode 122 of the battery device 120 is coupled to the cover part 112 via an unillustrated negative electrode lead. The cover part 112 thus serves as the negative electrode terminal.

As illustrated in FIGS. 8 and 9, in a case where the height H is fixed, the device space volume is determined not on the basis of the maximum outer diameter DM but on the basis of an effective outer diameter DY.

Specifically, for the flat secondary battery of the comparative example illustrated in FIG. 7, a schematic illustration of an internal configuration of the battery can 110 necessary for calculating the device space volume is as in FIG. 8. As is apparent from a correspondence relationship between FIGS. 7 and 8, a circumscribed rectangle K illustrated in FIG. 8 represents an outline of a rectangle defined by the height H and the maximum outer diameter DM.

In the flat secondary battery of the comparative example, due to the battery can 110 having the crimp part C, it is not possible to dispose the battery device 120 at a location (a space) where the crimp part C lies. Therefore, the volume of the internal space of the battery can 110 available for containing the battery device 120, i.e., the device space volume of the battery can 110, is determined not on the basis of the maximum outer diameter DM but on the basis of the effective outer diameter DY which is determined by subtracting a loss outer diameter DR corresponding to the crimp part C from the maximum outer diameter DM. The effective outer diameter DY is calculated in accordance with the following equation: Effective outer diameter DY=Maximum outer diameter DM−(Loss outer diameter DR×2). Note that the loss outer diameter DR is determined on the basis of the thickness of the containing part 111, the thickness of the cover part 112, and the thickness of the gasket 130. The loss outer diameter DR increases as the thickness of the gasket 130 is increased to improve the sealing property of the battery can 110.

In this case, inside the battery can 110, a loss space RS resulting from the loss outer diameter DR is large in volume because the loss outer diameter DR occurs at each of two locations. As a result, the volume of an effective space YS (the device space volume) corresponding to the effective outer diameter DY decreases. The "loss space RS" is an internal space that is not available for containing the battery device 120. The "effective space YS" is an internal space that is available for containing the battery device 120. Thus, due to the decrease in device space volume, the energy density per unit volume also decreases. This results in degradation of a characteristic such as a battery capacity characteristic, thus making it difficult to obtain a superior battery characteristic.

In contrast, for the flat secondary battery according to the present embodiment illustrated in FIG. 3, a schematic illustration of an internal configuration of the battery can 10 necessary for calculating the device space volume is as in FIG. 9.

In the flat secondary battery according to the present embodiment, unlike in the flat secondary battery of the comparative example, the battery can 10 includes no crimp part C. However, in the flat secondary battery according to the present embodiment, the battery can 10 has the plane surface M3F, and also has an excess space 10S between the plane surface M3F and the battery device 20 for disposing, e.g., a portion of the electrode terminal 30 therein. Thus, inside the battery can 10, it is not possible to dispose the battery device 20 in the excess space 10S. Needless to say, it is not possible to dispose the battery device 20 in a space outside the battery can 10 (the plane surface M3F), i.e., a space between the plane surface M3F and the circumscribed circle G, either.

Therefore, the volume of the internal space of the battery can 10 available for containing the battery device 20, i.e., the device space volume of the battery can 10, is determined not on the basis of the maximum outer diameter DM but on the basis of the effective outer diameter DY which is determined by subtracting the loss outer diameter DR corresponding to, e.g., the excess space 10S from the maximum outer diameter DM. The effective outer diameter DY is calculated in accordance with the following equation: Effective outer diameter DY=Maximum outer diameter DM–Loss outer diameter DR.

In this case, inside the battery can 10, the loss space RS resulting from the loss outer diameter DR is smaller in volume because the loss outer diameter DR occurs only at one location. As a result, the volume of the effective space YS (the device space volume) corresponding to the effective outer diameter DY increases. Thus, by virtue of the increase in device space volume, it is possible to increase the energy density per unit volume. This improves a characteristic such as a battery capacity characteristic. Accordingly, it is possible to achieve a superior battery characteristic.

In addition, in the flat secondary battery according to the present embodiment, a portion of the surface of the sidewall part M3 of the battery can 10 may be the plane surface M3F, and the electrode terminal 30 may be provided at the plane surface M3F. This suppresses a decrease in device space volume resulting from the electrode terminal 30 provided on the battery can 10. Accordingly, it is possible to achieve higher effects. In this case, the electrode terminal 30 may lie inside the circumscribed circle G defined on the basis of the curved surface M3C. This further suppresses a decrease in device space volume, thus making it possible to achieve even higher effects.

Further, the battery can 10 may be a crimpless can without the crimp part C. This avoids a large decrease in effective space YS (effective outer diameter DY) resulting from the presence of the crimp part C. As a result, it becomes easier to secure the device space volume, and it is thus possible to achieve higher effects. In this case, the battery can 10 may be a welded can. This makes it easy to provide the battery can 10 including no crimp part C. Accordingly, it is possible to achieve higher effects.

Further, the electrode terminal 30 may include the terminal part 31 having a small outer diameter (D1) and the terminal parts 32 and 33 having large outer diameters (D2 and D3). This helps to prevent the electrode terminal 30 from falling out of the battery can 10. Accordingly, stable charging and discharging operations are secured while the device space volume is secured. It is thus possible to achieve higher effects.

Further, the battery device 20 may have a three-dimensional shape corresponding to the three-dimensional shape of the battery can 10. This helps to prevent a dead space from resulting upon placing the battery device 20 in the battery can 10, thereby facilitating efficient use of the effective space YS inside the battery can 10. Accordingly, an area over which the positive electrode 21 and the negative electrode 22 are opposed to each other is secured. It is thus possible to achieve higher effects.

Further, the negative electrode 22 may be coupled to the battery can 10. This allows the battery can 10 to serve as the negative electrode terminal, making it unnecessary to separately provide a negative electrode terminal in the flat secondary battery. Accordingly, a decrease in effective volume due to the presence of the negative electrode terminal is avoided, and it is thus possible to achieve higher effects. In this case, the gasket 40 may be disposed between the battery can 10 and the electrode terminal 30. This prevents a short circuit between the electrode terminal 30 and the battery can 10 also in the case where the battery can 10 serves as the negative electrode terminal. Accordingly, stable charging and discharging operations are secured even if the battery can 10 is used as the negative electrode terminal. It is thus possible to achieve higher effects.

In particular, the electrode terminal 30 may serve as the positive electrode terminal and the battery can 10 may serve as the negative electrode terminal. This allows for easy coupling of the flat secondary battery to an electronic apparatus through the use of the electrode terminal 30 and the battery can 10. Accordingly, it is possible to improve convenience at the time of using the flat secondary battery.

Specifically, in the flat secondary battery of the comparative example (FIG. 7), the containing part 111 serves as the positive electrode terminal and the cover part 112 serves as the negative electrode terminal. In this case, because the containing part 111 and the cover part 112 are opposed to each other with the battery device 120 interposed therebetween, the positive electrode terminal and the negative electrode terminal are disposed in mutually opposite directions (the up direction and the down direction in FIG. 7) along the height direction. This makes it difficult to couple the flat secondary battery (the positive electrode terminal and the negative electrode terminal) of the comparative example to an electronic apparatus.

In contrast, in the flat secondary battery according to the present embodiment (FIG. 3), the electrode terminal 30 serves as the positive electrode terminal and the battery can 10 serves as the negative electrode terminal. In this case, because the electrode terminal 30 is provided on the battery can 10, the positive electrode terminal and the negative electrode terminal are disposed in a common direction (the horizontal direction in FIG. 3) along the height direction. This makes it possible to easily couple the flat secondary battery (the positive electrode terminal and the negative electrode terminal) according to the present embodiment to an electronic apparatus.

Further, in the battery device 20, the positive electrode 21 and the negative electrode 22 may be stacked with the separator 23 interposed therebetween (the stacked electrode body). This makes it harder for a dead space to occur in the battery device 20 than in a case where the positive electrode 21 and the negative electrode 22 are wound with the separator 23 interposed therebetween (a wound electrode body). The dead space is a space such as one formed at a winding core part of the wound electrode body. Thus, the energy density per unit volume further increases to make it possible to achieve higher effects.

Next, modifications of the foregoing flat secondary battery will be described. The configuration of the flat secondary battery is appropriately modifiable, for example, as will be described below. Note that any two or more of the following series of modifications may be combined.

[Modification 1]

Figure 10:
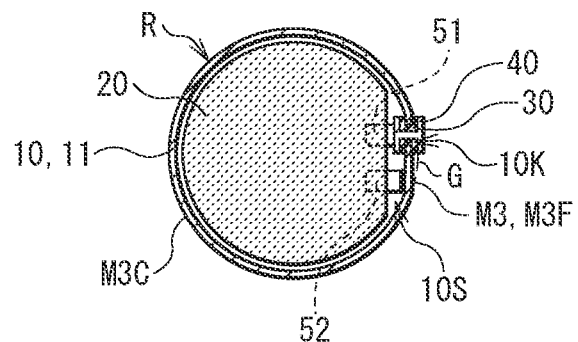
FIG. 10 is a sectional view of a configuration of a flat secondary battery of Modification 1.

In FIG. 2, the electrode terminal 30 lies inside the circumscribed circle G. However, as illustrated in FIG. 10 corresponding to FIG. 2, the position of the plane surface M3F may be shifted in a direction from the electrode terminal 30 toward the outside of the circumscribed circle G to allow a portion of the electrode terminal 30 to protrude to the outside of the circumscribed circle G. In this case also, the device space volume increases as compared with that in the flat secondary battery of the comparative example illustrated in FIG. 7. Accordingly, it is possible to achieve similar effects.

In the case illustrated in FIG. 10, however, while the shift in position of the plane surface M3F increases the volume of the internal space of the battery can 10 and accordingly increases also the device space volume, the energy density per unit volume can decrease due to an increase in outer diameter D. In order to secure the device space volume to thereby secure also the energy density per unit volume, it is therefore preferable that the electrode terminal 30 lie inside the circumscribed circle G as illustrated in FIG. 2.

Note that in FIG. 10, the position of the plane surface M3F is shifted to allow a portion of the electrode terminal 30 to protrude to the outside of the circumscribed circle G. However, instead of shifting the position of the plane surface M3F, the terminal part 32 may be increased in dimension in the direction of protrusion of the electrode terminal 30 to thereby allow a portion of the electrode terminal 30 to protrude to the outside of the circumscribed circle G. In this case also, the device space volume increases as compared with that in the flat secondary battery of the comparative example illustrated in FIG. 7. Accordingly, it is possible to achieve similar effects.

However, in a case of allowing a portion of the electrode terminal 30 to protrude to the outside of the circumscribed circle G without a shift in position of the plane surface M3F, the outer diameter D increases, although the device space volume does not change. As a result, the energy density per unit volume can decrease. In order to secure the device space volume to thereby secure also the energy density per unit volume, it is therefore preferable that the electrode terminal 30 lie inside the circumscribed circle G, as described above.

[Modification 2]

In FIGS. 1 and 2, the surface of the sidewall part M3 of the battery can 10 includes the curved surface M3C and the plane surface M3F, and the electrode terminal 30 is thus provided at the plane surface M3F.

Figure 11:
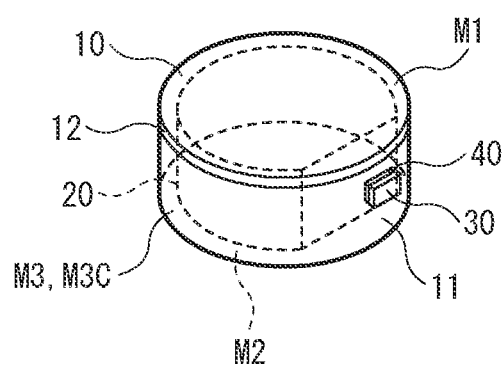
FIG. 11 is a perspective view of a configuration of a flat secondary battery of Modification 2.
Figure 12:
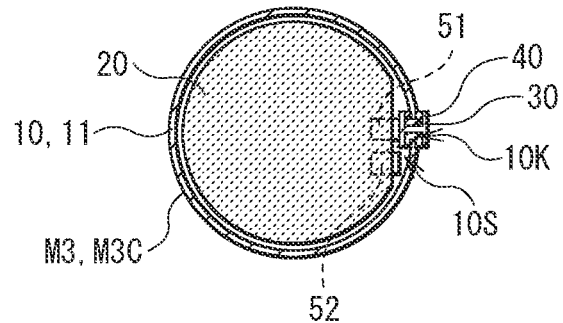
FIG. 12 is a sectional view of the configuration of the flat secondary battery of Modification 2.

However, as illustrated in FIG. 11 corresponding to FIG. 1 and in FIG. 12 corresponding to FIG. 2, the surface of the sidewall part M3 may entirely be the curved surface M3C without including the plane surface M3F, and the electrode terminal 30 may thus be provided at the curved surface M3C. In other words, the battery can 10 may have a flat and cylindrical three-dimensional shape. In this case also, the device space volume increases as compared with that in the flat secondary battery of the comparative example illustrated in FIG. 7. Accordingly, it is possible to achieve similar effects.

However, in the case illustrated in FIGS. 11 and 12, the outer diameter D increases due to the configuration in which the electrode terminal 30 is provided at the curved surface M3C. This results in a relative decrease in device space volume with respect to the outer diameter D, causing the energy density per unit volume to decrease. In order to increase the energy density per unit volume as much as possible, it is therefore preferable that the electrode terminal 30 be provided at the plane surface M3F as illustrated in FIG. 2.

Note that in the case where the surface of the sidewall part M3 includes the curved surface M3C and the plane surface M3F, the electrode terminal 30 may be provided at the curved surface M3C; however, for the above-described reason, it is preferable that the electrode terminal 30 be provided at the plane surface M3F in order to secure the energy density per unit volume.

[Modification 3]

In FIG. 3, the battery device 20 is a stacked electrode body. Accordingly, in the battery device 20, the positive electrode 21 and the negative electrode 22 are stacked with the separator 23 interposed therebetween.

Figure 13:
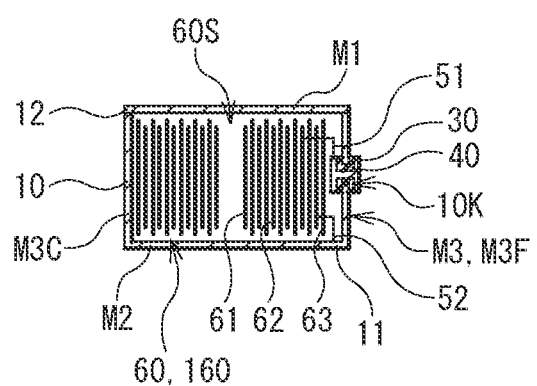
FIG. 13 is a sectional view of a configuration of a flat secondary battery of Modification 3.

However, as illustrated in FIG. 13 corresponding to FIG. 3, the flat secondary battery may include a battery device 60 which is a wound electrode body, in place of the battery device 20 which is a stacked electrode body. In the battery device 60, a positive electrode 61 and a negative electrode 62 are wound with a separator 63 interposed therebetween. More specifically, in the battery device 60 which is a wound electrode body, the positive electrode 61 and the negative electrode 62 are wound with the separator 63 interposed therebetween. More specifically, the positive electrode 61 and the negative electrode 62 are stacked on each other with the separator 63 interposed therebetween, and are wound in the state of the stack with the separator 23 interposed between the positive electrode 61 and the negative electrode 62. The battery device 60 has, at the winding core part, a space (a winding center space 60S) in which none of the positive electrode 61, the negative electrode 62, and the separator 63 is present. The positive electrode 61, the negative electrode 62, and the separator 63 have configurations similar to those of the positive electrode 21, the negative electrode 22, and the separator 23, respectively.

A method of manufacturing the flat secondary battery illustrated in FIG. 13 is similar to the method of manufacturing the flat secondary battery illustrated in FIG. 3 except that, after the positive electrode 61 and the negative electrode 62 are alternately stacked with the separator 63 interposed therebetween, the stack of the positive electrode 61, the negative electrode 62, and the separator 63 is wound to thereby fabricate a wound body 160 to be used to fabricate the battery device 60. In this case, the wound body 160 is enclosed inside the battery can 10 (the containing part 11 and the cover part 12), and thereafter the wound body 160 is impregnated with an electrolytic solution injected into the battery can 10. The battery device 60 is thereby fabricated.

In this case also, the device space volume increases as compared with that in the flat secondary battery of the comparative example illustrated in FIG. 7. Accordingly, it is possible to achieve similar effects. However, as described above, in order to avoid a decrease in energy density per unit volume due to the occurrence of a dead space (the winding center space 60S), the battery device 20 which is a stacked electrode body causing no dead space is preferable to the battery device 60 which is a wound electrode body causing the dead space.

[Modification 4]

In FIG. 3, the electrode terminal 30 is coupled to the battery device 20 (the positive electrode 21) via the positive electrode lead 51, and the battery device 20 (the negative electrode 22) is coupled to the battery can 10 via the negative electrode lead 52. Thus, the electrode terminal 30 serves as the positive electrode terminal, and the battery can 10 serves as the negative electrode terminal.

However, the electrode terminal 30 may be coupled to the battery device 20 (the negative electrode 22) via the negative electrode lead 52, and the battery device 20 (the positive electrode 21) may be coupled to the battery can 10 via the positive electrode lead 51. Thus, the electrode terminal 30 may serve as the negative electrode terminal, and the battery can 10 may serve as the positive electrode terminal.

In this case, in order to serve as the negative electrode terminal, the electrode terminal 30 includes one or more of materials including, without limitation, iron, copper, nickel, stainless steel, an iron alloy, a copper alloy, and a nickel alloy. In order to serve as the positive electrode terminal, the battery can 10 includes one or more of materials including, without limitation, aluminum, an aluminum alloy, and stainless steel.

In this case also, the device space volume increases as compared with that in the flat secondary battery of the comparative example illustrated in FIG. 7. Accordingly, it is possible to achieve similar effects.

[Modification 5]

In FIGS. 2 to 4, the terminal parts 31 to 33 of the electrode terminal 30 all have a cylindrical three-dimensional shape, and therefore the electrode terminal 30 as a whole has a generally cylindrical three-dimensional shape. However, the three-dimensional shape of each of the terminal parts 31 to 33 is not particularly limited as long as the electrode terminal 30 is able to serve as the positive electrode terminal. Specifically, the terminal parts 31 to 33 may each have another three-dimensional shape, such as a shape of a polygonal prism, and the electrode terminal 30 as a whole may thus have another, generally polygonal prismatic three-dimensional shape. The polygonal prism is not particularly limited, and examples thereof include a triangular prism, a rectangular prism, and a pentagonal prism. In this case also, the device space volume increases, making it possible to achieve similar effects.

Note that although not specifically illustrated here, other different variations are possible for the three-dimensional shape of the electrode terminal 30. Specifically, the electrode terminal 30 may include only the terminal parts 31 and 32 without the terminal part 33, or may include only the terminal parts 31 and 33 without the terminal part 32. Alternatively, the electrode terminal 30 may have a substantially uniform outer diameter D as a whole, and therefore the electrode terminal 30 may be substantially constant in outer diameter D. In this case also, it is possible to achieve similar effects.

[Modification 6]

The positive electrode lead 51 may be physically separated from the positive electrode current collector and thereby provided as a component separate from the positive electrode current collector. Alternatively, the positive electrode lead 51 may be physically coupled to the positive electrode current collector and thereby integrated with the positive electrode current collector. In the latter case, in a process of forming the positive electrode 21 by means of a punching process on a metal foil, the positive electrode current collector after forming the positive electrode active material layer thereon may be punched into a configuration in which the positive electrode lead 51 and the positive electrode current collector are integrated with each other. It is thereby possible to form the positive electrode 21 including the positive electrode current collector integrated with the positive electrode lead 51. In this case also, electrical conduction between the positive electrode lead 51 and the positive electrode current collector is secured. Accordingly, it is possible to achieve similar effects.

Note that, in a case where the positive electrode lead 51 is integrated with the positive electrode current collector, the positive electrode 21 need not have a foil winding structure, and therefore the positive electrode active material layer may be provided on the entire positive electrode current collector. In other words, the positive electrode current collector does not have to be exposed at each of the ends of the positive electrode 21 on the inner side and the outer side of the winding.

Modification 6 described here is also applicable to the negative electrode lead 52 and the negative electrode current collector. More specifically, the negative electrode lead 52 may be separate from the negative electrode current collector or may be integrated with the negative electrode current collector. In this case also, electrical conduction between the negative electrode lead 52 and the negative electrode current collector is secured. Accordingly, it is possible to achieve similar effects. Needless to say, in a case where the negative electrode lead 52 is integrated with the negative electrode current collector, the negative electrode 22 need not have the foil winding structure, and the negative electrode active material layer may thus be provided on the entire negative electrode current collector.

[Modification 7]

In the process of manufacturing the secondary battery, the stacked body 20Z is placed into the containing part 11, and the cover part 12 is joined to the containing part 11 by a method such as a welding method, following which the electrolytic solution is injected into the battery can 10 (the containing part 11 and the cover part 12) through the liquid injection hole. In other words, the stacked body 20Z is impregnated with the electrolytic solution by injecting the electrolytic solution into the battery can 10 after the battery can 10 is formed, that is, after the cover part 12 is joined to the containing part 11.

However, the cover part 12 may be joined to the containing part 11 by a method such as a welding method after the stacked body 20Z is placed into the containing part 11 and the electrolytic solution is injected into the containing part 11. In other words, the stacked body 20Z may be impregnated with the electrolytic solution by injecting the electrolytic solution into the containing part 11 before the battery can 10 is formed, that is, before the cover part 12 is joined to the containing part 11. In this case, the battery can 10 does not have to be provided with the liquid injection hole.

In this case also, the battery device 20 is fabricated by impregnation of the stacked body 20Z with the electrolytic solution, and the battery device 20 is sealed inside the battery can 10. Accordingly, it is possible to achieve similar effects. In this case, in particular, it is possible to simplify the configuration of the battery can 10 because it is unnecessary for the battery can 10 to have the liquid injection hole. Further, because the electrolytic solution is injected into the containing part 11 through the opening 11K having an opening area larger than that of the liquid injection hole, it is possible to improve efficiency of injection of the electrolytic solution for the stacked body 20Z, and to simplify the process of injecting the electrolytic solution.

Although the technology has been described above with reference to some embodiments and examples, configurations of the technology are not limited to those described with reference to the embodiments and examples above, and are therefore modifiable in a variety of ways.

Specifically, while a description has been given of a case of using a liquid electrolyte (an electrolytic solution), the electrolyte is not limited to a particular kind. Thus, a gel electrolyte (an electrolyte layer) may be used, or an electrolyte in a solid form (a solid electrolyte) may be used.

Further, while a description has been given of a case where the battery device has a wound-type device structure (a wound electrode body) and a case where the battery device has a stacked-type device structure (a stacked electrode body), the device structure of the battery device is not particularly limited, and any other device structure, such as a zigzag-folded-type device structure where the electrodes (the positive electrode and the negative electrode) are folded in a zigzag shape, may be chosen.

Further, while a description has been given of a case where the electrode reactant is lithium, the electrode reactant is not particularly limited. Specifically, the electrode reactant may be, as described above, another alkali metal, such as sodium or potassium, or may be an alkaline earth metal, such as beryllium, magnesium, or calcium. Other than the above, the electrode reactant may be another light metal, such as aluminum.

The effects described herein are mere examples. Therefore, the effects of the technology are not limited to the effects described herein. Accordingly, the technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A flat secondary battery comprising:
an outer package member having a flat and columnar shape, the outer package member including a pair of bottom parts and a sidewall part, the bottom parts being opposed to each other, the sidewall part lying between the bottom parts, wherein a first surface of the sidewall part is a curved surface and a second surface of the sidewall part is a flat plane surface, the flat plane surface having a first side and a second side opposite the first side, wherein when viewed from above, the curved surface intersects the flat plane surface at two points and, on that plane, there is a recess for an electrode terminal;
a battery device contained inside the outer package member and including a positive electrode and a negative electrode;
the electrode terminal, which is provided to be exposed at the sidewall part and coupled to one of the positive electrode and the negative electrode; and
a gasket extending through the flat plane surface, arranged in direct contact with the electrode terminal, arranged in direct contact with the first side of the flat plane surface, and arranged in direct contact with the second side of the flat plane surface.

2. The flat secondary battery according to claim 1, wherein the outer package member includes no crimp part.

3. The flat secondary battery according to claim 2, wherein the outer package member includes two or more members that are welded to each other.

4. The flat secondary battery according to claim 1, wherein
the outer package member has a through hole at the second surface of the sidewall part, and
the electrode terminal includes
a first terminal part disposed in the through hole and having an outer diameter smaller than an inner diameter of the through hole, and
a second terminal part and a third terminal part that are coupled to respective ends of the first terminal part that are opposite to each other in a direction from the electrode terminal toward an inside of the outer package member, the second terminal part and the third terminal part each having an outer diameter larger than the inner diameter of the through hole.

5. The flat secondary battery according to claim 1, wherein the battery device has a three-dimensional shape corresponding to a three-dimensional shape of the outer package member.

6. The flat secondary battery according to claim 1, wherein one of the positive electrode and the negative electrode is coupled to the outer package member.

7. The flat secondary battery according to claim 1, wherein
the battery device further includes a separator, and
the positive electrode and the negative electrode are stacked with the separator interposed therebetween.

8. The flat secondary battery according to claim 1, wherein
the battery device further includes a separator, and
the positive electrode and the negative electrode are wound with the separator interposed therebetween.

9. The flat secondary battery according to claim 1, wherein
the battery has two electrode terminals,
one of the two electrode terminals is derived from the flat plane surface, and
the other one of the two electrode terminals is derived from somewhere other than the flat plane surface.

10. The flat secondary battery according to claim 1, wherein an end of the gasket on an interior side of the outer package member is positioned on an interior side of the flat plane surface.

* * * * *